United States Patent
Bachan (10) Patent No.: US 7,351,054 B2
(45) Date of Patent: Apr. 1, 2008

(54) COOLING INJECTION MOLD

(76) Inventor: Douglas J. Bachan, 5258 Breeze Hill Pl., Troy, MI (US) 48098

( * ) Notice: Subject to any disclaimer, the term of this patent is extended or adjusted under 35 U.S.C. 154(b) by 0 days.

(21) Appl. No.: 11/354,775

(22) Filed: Feb. 15, 2006

(65) Prior Publication Data

US 2006/0131473 A1   Jun. 22, 2006

Related U.S. Application Data

(63) Continuation of application No. 10/852,956, filed on May 25, 2004.

(51) Int. Cl.
B29C 45/73  (2006.01)

(52) U.S. Cl. ......................... 425/552; 249/79

(58) Field of Classification Search ................ 425/190, 425/195, 526, 552; 249/79; 264/328.16; 164/443

See application file for complete search history.

(56) References Cited

U.S. PATENT DOCUMENTS

| | | | |
|---|---|---|---|
| 3,967,673 A * | 7/1976 | Bower, Jr. .................. 164/459 |
| 4,182,397 A * | 1/1980 | Schmucker et al. ........ 164/443 |
| 5,031,483 A | 7/1991 | Weaver |
| 5,204,055 A | 4/1993 | Sachs et al. |
| 5,340,656 A | 8/1994 | Sachs et al. |
| 5,387,380 A | 2/1995 | Cima et al. |
| 5,427,519 A | 6/1995 | Gellert |
| 5,439,622 A | 8/1995 | Pennisi et al. |
| 5,501,592 A | 3/1996 | Kitamura |
| 5,545,366 A | 8/1996 | Lust et al. |
| 5,562,846 A | 10/1996 | McKeen |
| 5,849,238 A | 12/1998 | Schmidt et al. |
| 5,927,378 A * | 7/1999 | Grove et al. ................. 164/485 |
| 6,079,972 A * | 6/2000 | Gellert ....................... 425/552 |
| 6,112,804 A | 9/2000 | Sachs et al. |
| 6,173,756 B1 * | 1/2001 | Fehlemann .................. 164/443 |
| 6,289,970 B1 * | 9/2001 | Fehlemann .................. 164/443 |
| 6,472,029 B1 | 10/2002 | Skszek |
| 7,008,211 B2 * | 3/2006 | Lee ............................ 425/190 |
| 7,025,584 B2 * | 4/2006 | Tsau ........................... 425/526 |
| 2002/0162940 A1 | 11/2002 | Frul et al. |

* cited by examiner

Primary Examiner—Robert B. Davis
(74) Attorney, Agent, or Firm—Harness, Dickey & Pierce, P.L.C.

(57) ABSTRACT

The present invention provides an apparatus for molding a material such as plastic. The apparatus includes a mold body, a first plurality of ribs, and a second plurality of ribs. The mold body includes a molding skin of substantially uniform thickness having a first surface and a second surface. The first surface is adapted to mold a part. The second surface is opposite the first surface. The first plurality of ribs extend from the second surface. A plurality of thermal conduction surfaces are defined on the second surface between the first plurality of ribs. The second plurality of ribs are interleaved with the first plurality of ribs. The second plurality of ribs include end surfaces displaced a substantially uniform distance from the plurality of thermal conduction surfaces to define a plurality of fluid flow conduits adapted to contain a coolant.

16 Claims, 6 Drawing Sheets

COOLING INJECTION MOLD

CROSS-REFERENCE TO RELATED APPLICATIONS

This application is a continuation of U.S. patent application Ser. No. 10/852,956, filed May 25, 2004. The disclosure of the above application is incorporated herein by reference.

FIELD OF THE INVENTION

The present invention relates to an apparatus for heating and cooling molds for injection molding and other applications where heat exchange is critical to the production process.

BACKGROUND OF THE INVENTION

Molds for injection, thermoplastic, thermoset, blow, or reaction molding typically are manufactured from metallic materials such as steel, stainless steel, aluminum, or copper based alloys. These materials possess properties suitable to a wide variety of mold tool requirements. Thermal conductivity, strength, hardness, machine-ability, durability, and cost are primary considerations. Molds typically have two halves and a core. These components mate with each other in a sealed off fashion. When in the closed condition, a cavity exists between the two halves. This cavity defines the product to be molded. Complex products may require additional mechanical actions to create special features.

Electrically heated manifold systems internal to the mold are often utilized to deliver hot melted resin from an injection press nozzle to the cavity through a series of channels in the mold manifold. After the mold opens and the molded part has cooled adequately, mechanical pins or other means eject the part from the mold. The time required to cool the part is determined by the capability of the heat management system incorporated in the mold. Typically, molds have a bore or series of bores in the core blocks for carrying a coolant. The coolant extracts heat from the molded product during the molding cycle. These bores are designed in various configurations utilizing accepted fluid dynamic physics. System layouts can include serial bores, parallel bores, or a combination of both. Serial systems link one or more bores in sequential order, referred to as a circuit with bore size remaining constant. Parallel systems supply fluid via larger bores to a series of smaller bores, similar to lawn irrigation systems.

These serial and parallel systems, however, are designed with the limitations of traditional manufacturing technologies such as drilling. Drilled bores are generally limited to being straight. Therefore, to achieve a non-linear bore, a series of intersecting bores must be drilled. The series of intersecting bores are unable to follow the smooth irregular contour of many molded parts and, consequently, cannot achieve uniform heat transfer.

Other established mold design/manufacturing techniques additionally utilize conventional or computer controlled machining to cut square or "U" shaped channels through plates, cylinders, cones, and other mold components. A plurality of mating plates are then stacked to cover the open side of the channel. "O" rings or other gasket materials are utilized to seal the mated plates. The molded part surface is generally on the opposing side of the plate or component that has the channel machined through it. While this allows more complex cooling systems to be created than the conventional drilling technique, it is limited to generally flat or cylindrical conditions and cannot consistently follow free form shapes.

SUMMARY OF THE INVENTION

The present invention provides an apparatus for molding a material such as plastic. The apparatus includes a mold body, a first plurality of ribs, and a second plurality of ribs. The mold body includes a molding skin of substantially uniform thickness having a first surface and a second surface. The first surface is adapted to. mold a part. The second surface is opposite the first surface. The first plurality of ribs extend from the second surface. A plurality of thermal conduction surfaces are defined on the second surface between the first plurality of ribs. The second plurality of ribs are interleaved with the first plurality of ribs. The second plurality of ribs include end surfaces displaced a substantially uniform distance from the plurality of thermal conduction surfaces. A plurality of fluid flow conduits are defined between the end surfaces and thermal conduction surfaces. The fluid flow conduits are adapted to contain a coolant.

Another aspect of the present invention provides a method of cleaning fluid flow paths within a molding apparatus. The method generally comprises removing a plurality of ribs from a plurality of interstitial channels formed in the molding apparatus, wherein the molding apparatus includes a molding skin of substantially uniform thickness. Next, a plurality of thermal conduction surfaces are exposed. The plurality of thermal conduction surfaces are disposed on the molding skin and in communication with the plurality of interstitial channels. Finally, the plurality of thermal conduction surfaces are cleaned.

Another aspect of the present invention provides a method of manufacturing an apparatus for molding a material. First, a plurality of interstitial channels are machined into a face of a molding member. The plurality of interstitial channels define a plurality of thermal conduction surfaces. Then, a plurality of ribs are removably positioned within the plurality of interstitial channels. A plurality of fluid flow conduits are defined between the plurality of ribs and the thermal conduction surfaces.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiments are merely exemplary in nature and are in no way intended to limit the scope of the invention, its application, or its uses.

FIGS. 1-5 illustrate a molding apparatus 10 for molding a material in accordance with the present invention. The molding apparatus 10 generally includes a head mold 12, a block mold 14, a plurality of rib inserts 16, and a back plate 18. The head mold 12 is stacked on top of the block mold 14 to define a part cavity 15. The plurality of rib inserts 16 are inserted into a plurality of interstitial channels in the block mold 14. The back plate 18 supports the plurality of ribs 16 within the block mold 14. In an exemplary embodiment, the components of the molding apparatus 10 are secured together with a clamping mechanism (not shown).

Figure 2:
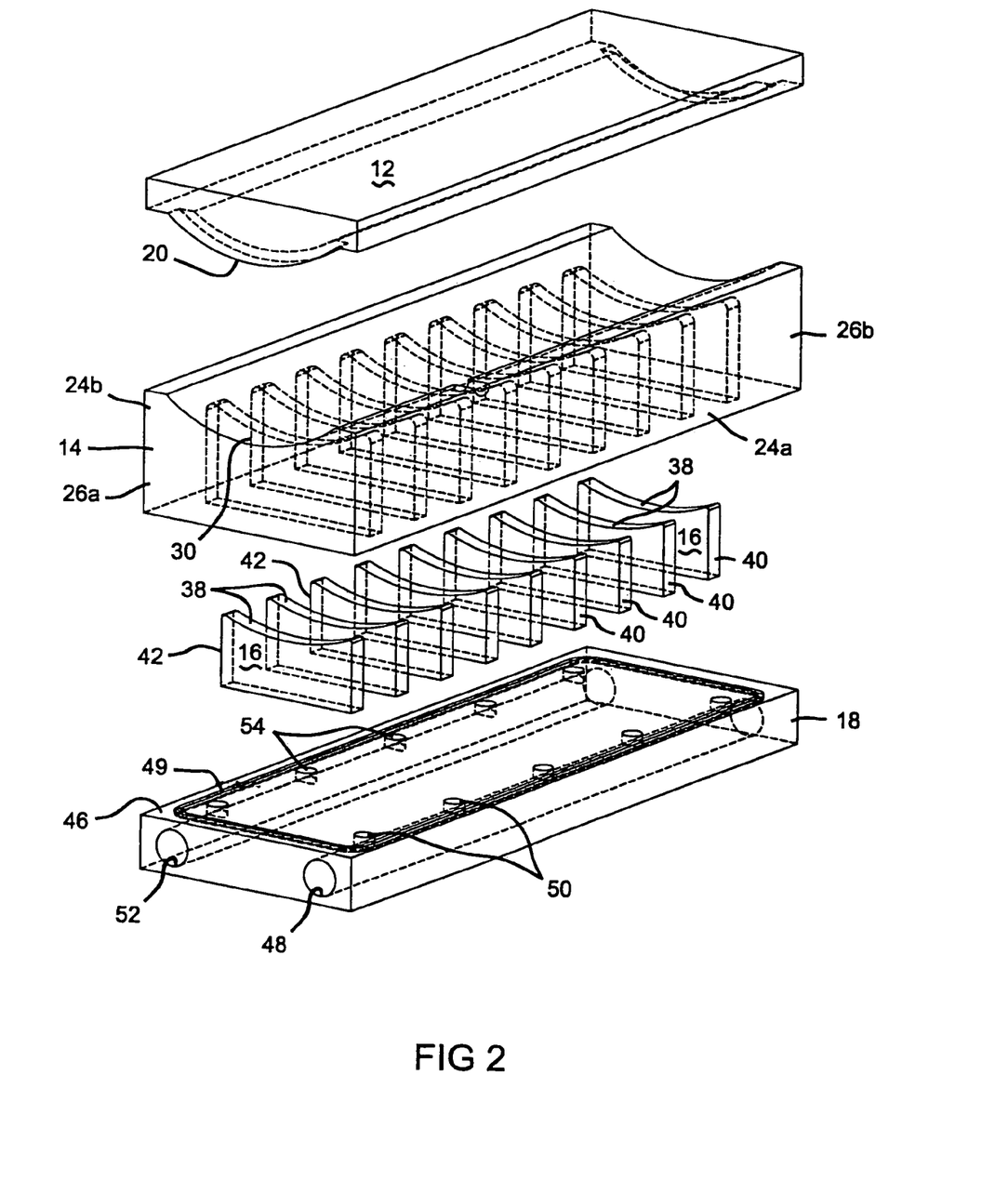
FIG. 2 is an exploded view of the apparatus of FIG. 1.

The head mold 12 generally includes a solid member defining a first molding surface 20. The first molding surface 20 is shaped in accordance with a predetermined contour. The predetermined contour is based on the geometry of a desired part to be molded. In an exemplary embodiment, the head mold 12 is constructed of steel.

The block mold 14 generally includes a molding skin 22, a pair of longitudinal sidewalls 24a, 24b, a pair of transverse sidewalls 26a, 26b, and a plurality of ribs 28. The molding skin 22 includes a molding surface 30 and a plurality of thermal conduction surfaces, each identified by reference numeral 32. Similar to the first molding surface 20 of the head mold 12, the molding surface 30 of the molding skin 22 is shaped in accordance with a predetermined contour. In an exemplary embodiment, the predetermined contour of the molding surface 30 is substantially similar to the predetermined contour of the first molding surface 20 to form a part of generally uniform thickness. In an alternative embodiment, the molding surface 30 is of a different predetermined contour than that of the first molding surface 20 to form a part having variable thickness.

The plurality of thermal conduction surfaces 32 also follow the predetermined contour of the molding surface 30. This provides for the molding skin 22 to have a substantially uniform thickness in the regions adjacent the thermal conduction surfaces 32. In an exemplary embodiment, this thickness ranges 3-30 millimeters. The plurality of thermal conduction surfaces 32 are generally equally spaced apart. The spacing is a function of the thickness of the molding skin 22. For example, the closer the spacing between the plurality of thermal conduction surfaces 32, the thinner the molding skin 22 may be. This minimizes the variance in temperature across the molding surface 30.

Figure 3:
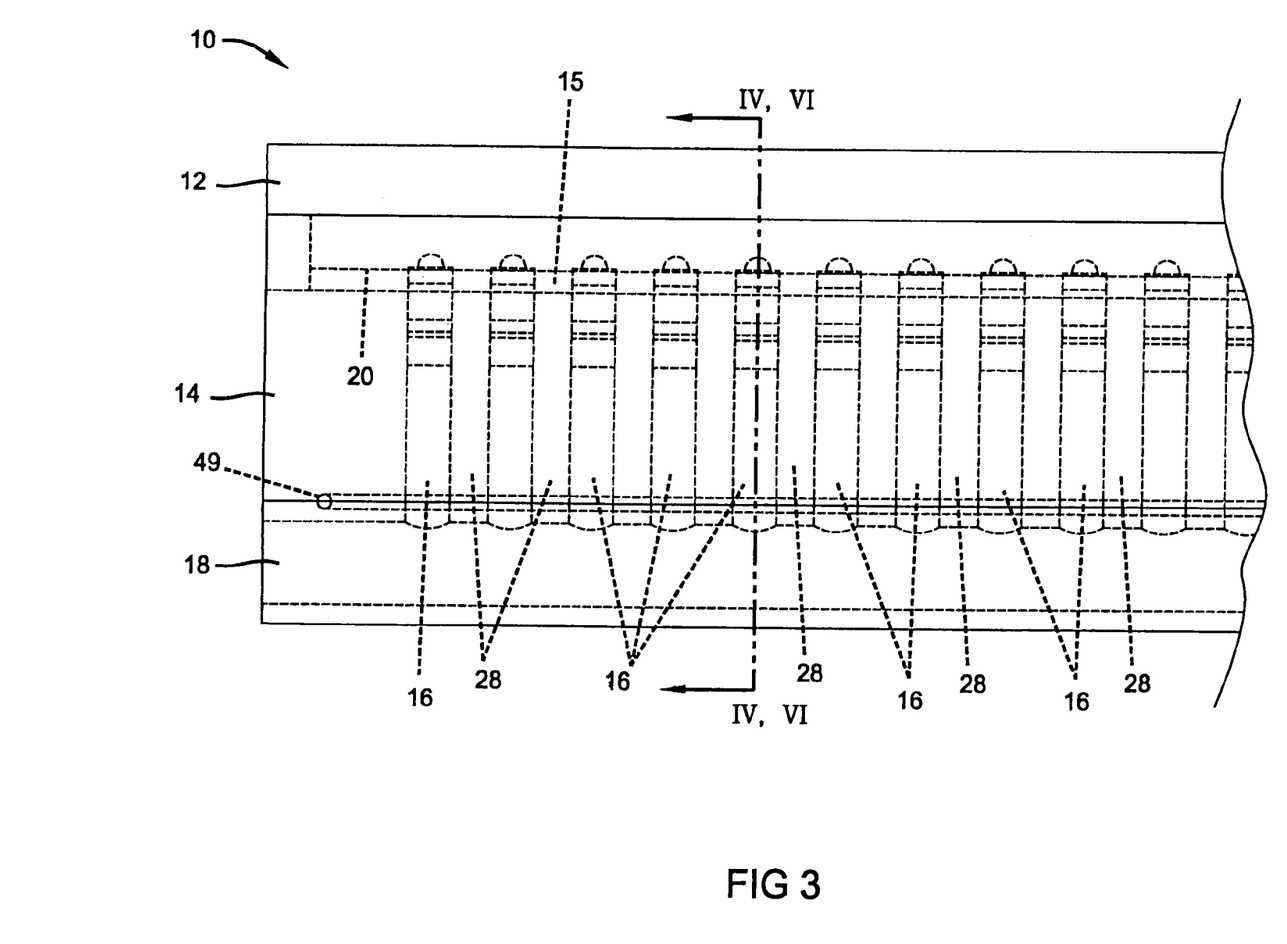
FIG. 3 is a partial side view of the apparatus of FIG. 1.
Figure 5:
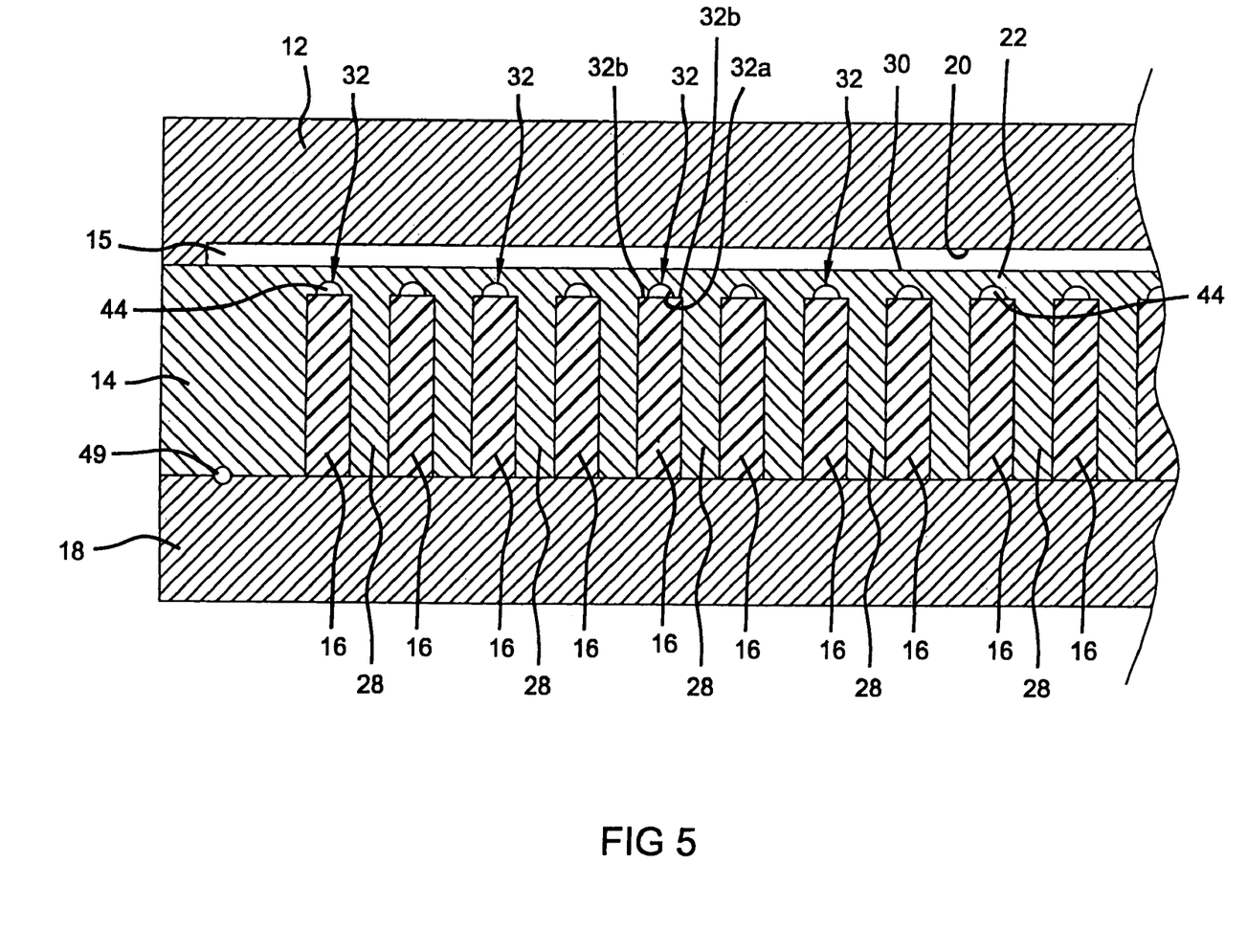
FIG. 5 is a partial cross-sectional view taken through line V-V in FIG. 1.

FIGS. 3 and 5 illustrate the profiles of the plurality of thermal conduction surfaces 32. The plurality of thermal conduction surfaces 32 each include an arched portion 32a flanked by a pair of shoulder portions 32b. The arched portion 32a is stronger than a squared profile and, therefore, provides for the use of a thinner molding skin 22. In one embodiment, the plurality of thermal conduction surfaces 32 are machined into the block mold 14 and include a steel surface. In an alternative embodiment, the plurality of thermal conduction surfaces 32 are plated with a non-corrosive material such as nickel, Teflon®, or a combination of both.

The pairs of longitudinal sidewalls 24a, 24b and transverse sidewalls 26a, 26b define the external dimensions of the block mold 14. The first longitudinal sidewall 24a includes a plurality of inlet surfaces 34. The plurality of inlet surfaces 34 are aligned with the plurality of thermal conduction surfaces 32. The second longitudinal sidewall 24b includes a plurality of outlet surfaces 36. The plurality of outlet surfaces 36 are also aligned with the plurality of thermal conduction surfaces 32. The first longitudinal sidewall 24a further includes an injection port 37 (shown in FIG. 1). The injection port 37 provides a means to inject a working material such as thermoplastic into the part cavity 15 during operation. The plurality of ribs 28 extend between the pair of longitudinal sidewalls 24a, 24b and define the plurality of thermal conduction surfaces 32.

Figure 4:
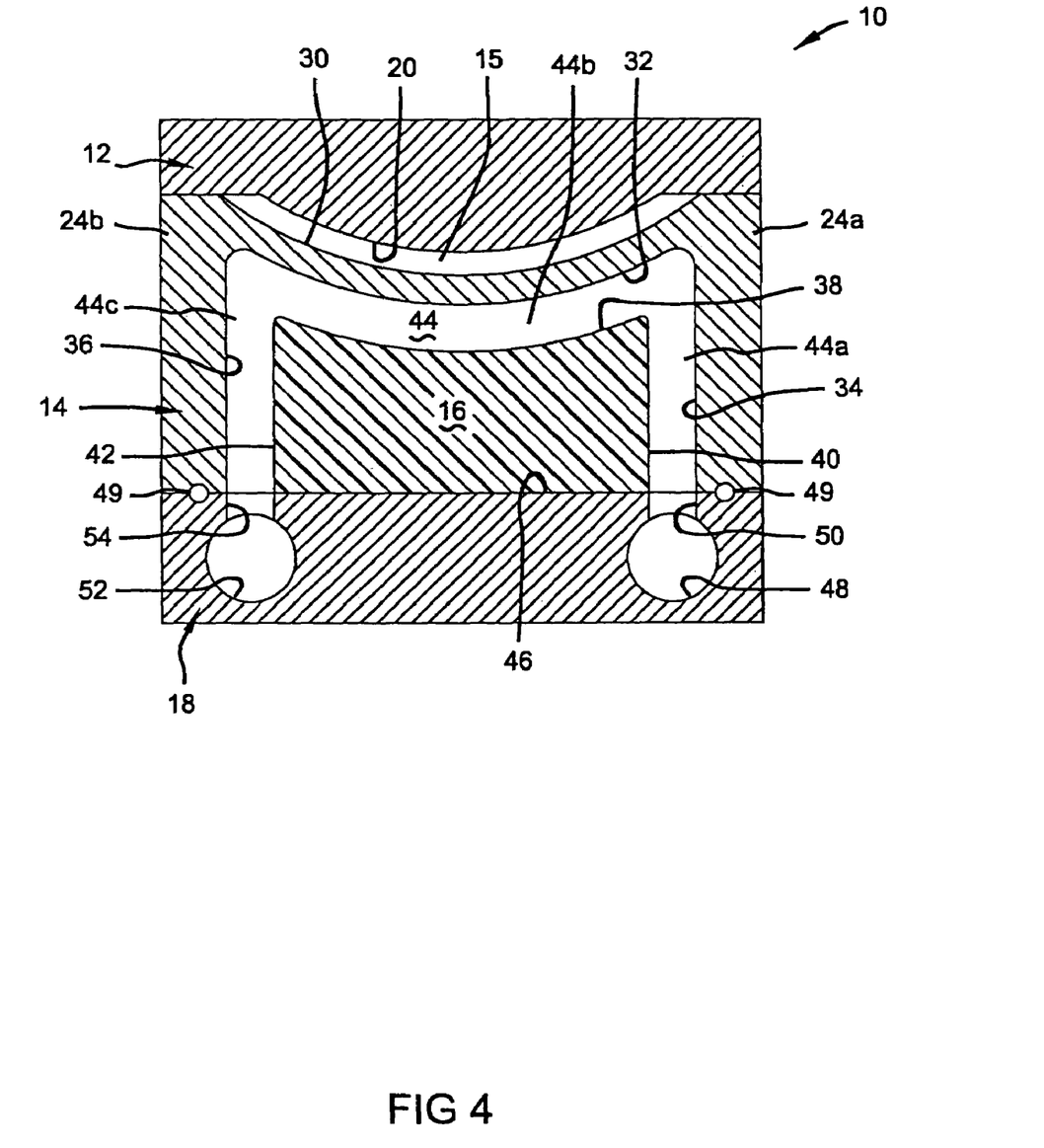
FIG. 4 is a cross-sectional view taken through line IV-IV in FIG. 3.

Each of the plurality of rib inserts 16 include an end surface 38, an inlet surface 40, and an outlet surface 42. The plurality of rib inserts 16 are interleaved with the plurality of ribs 28 of the block mold 14. A portion of the end surfaces 38 engage the shoulder portions 32b of the thermal conduction surfaces 32. As best seen in FIG. 4, the rib inserts 16 define a plurality of fluid communication conduits 44.

The fluid communication conduits 44 each include an inlet conduit 44a, a thermal conduction conduit 44b, and an outlet conduit 44c. The inlet conduits 44a are defined between the inlet surfaces 40 of the rib inserts 16 and the inlet surfaces 34 of the first longitudinal sidewall 24a. The plurality of thermal conduction conduits 44b are defined between the end surfaces 38 of the rib inserts 16 and the thermal conduction surfaces 32 of the block mold 14. The plurality of outlet conduits 44c are defined between the outlet surfaces 42 of the rib inserts 16 and the outlet surfaces 36 of the second longitudinal sidewall 24b. As best seen in FIGS. 3 and 5, the thermal conduction conduits 44b include elongated conduits having generally semi-circular cross-sections. It should be appreciated, however, that the thermal conduction conduits 44b may include alternative cross-sectional geometries. For example, in one embodiment the thermal conduction surfaces 32 and the end surfaces 38 of the rib inserts 16 may include opposing semi-circular cross-sections, thereby defining thermal conduction conduits 44b having circular cross-sections. It is envisioned that the thermal conduction surfaces 32 and the end surfaces 38 of the rib inserts 16 may include geometries defining thermal conduction conduits 44b having nearly any cross-sectional geometry obtainable by machining operations. In the embodiment illustrated, the plurality of rib inserts 16 are constructed of a polymer such as nylon. The nylon rib inserts 16 are interference fit between the plurality of ribs 28 in the block mold 14. In an alternative embodiment, the plurality of rib inserts 16 are constructed of a metal such as steel, aluminum, or copper.

The back plate 18 includes a support surface 46, an input bore 48, a plurality of input throats 50, an output bore 52, and a plurality of output throats 54. The support surface 46 engages the plurality of rib inserts 16, the longitudinal sidewalls 24a, 24b, and the transverse sidewalls 26a, 26b. The back plate 18 supports the plurality of rib inserts 16 within the block mold 14. An o-ring 49 is disposed between the back plate 18 and the longitudinal and transverse sidewalls 24, 26. The o-ring 49 is generally rectangular and provides a fluid tight seal between the back plate 18 and the block mold 14.

The input bore 48 is in fluid communication with the plurality of fluid communication conduits 44 via the plurality of input throats 50. The output bore 52 is in fluid communication with the plurality of fluid communication conduits 44 via the plurality of output throats 54. In an alternative embodiment, the back plate 18 and the plurality of rib inserts 16 are constructed of one piece.

A fluid source such as a water line (not shown) attaches to the input bore 48 to provide a coolant to the plurality of fluid communication conduits 44. The coolant flows into the inlet conduits 44a, through the thermal conduction conduits 44b, and out the outlet conduits 44c to the output bore 52. A drain line (not shown) attaches to the output bore 52. The drain line provides for dispensing or recycling the coolant. In an exemplary embodiment, the coolant is a water-based coolant supplied at a pressure of 30-200 psi. The most efficient use of the coolant occurs when the velocity of the coolant is sufficient to achieve turbulent flow within the thermal conduction conduits 44b. Turbulence is caused by friction between the coolant and the thermal conduction surfaces 32 of the block mold 14 and end surfaces 38 of the rib inserts 16. In the absence of turbulent flow, the coolant flows in a laminar fashion, wherein only the outer edges of the flowing coolant acts to input or remove thermal energy from the thermal conduction surfaces 32. Laminar flow is highly ineffective in transferring thermal energy.

Figure 6:
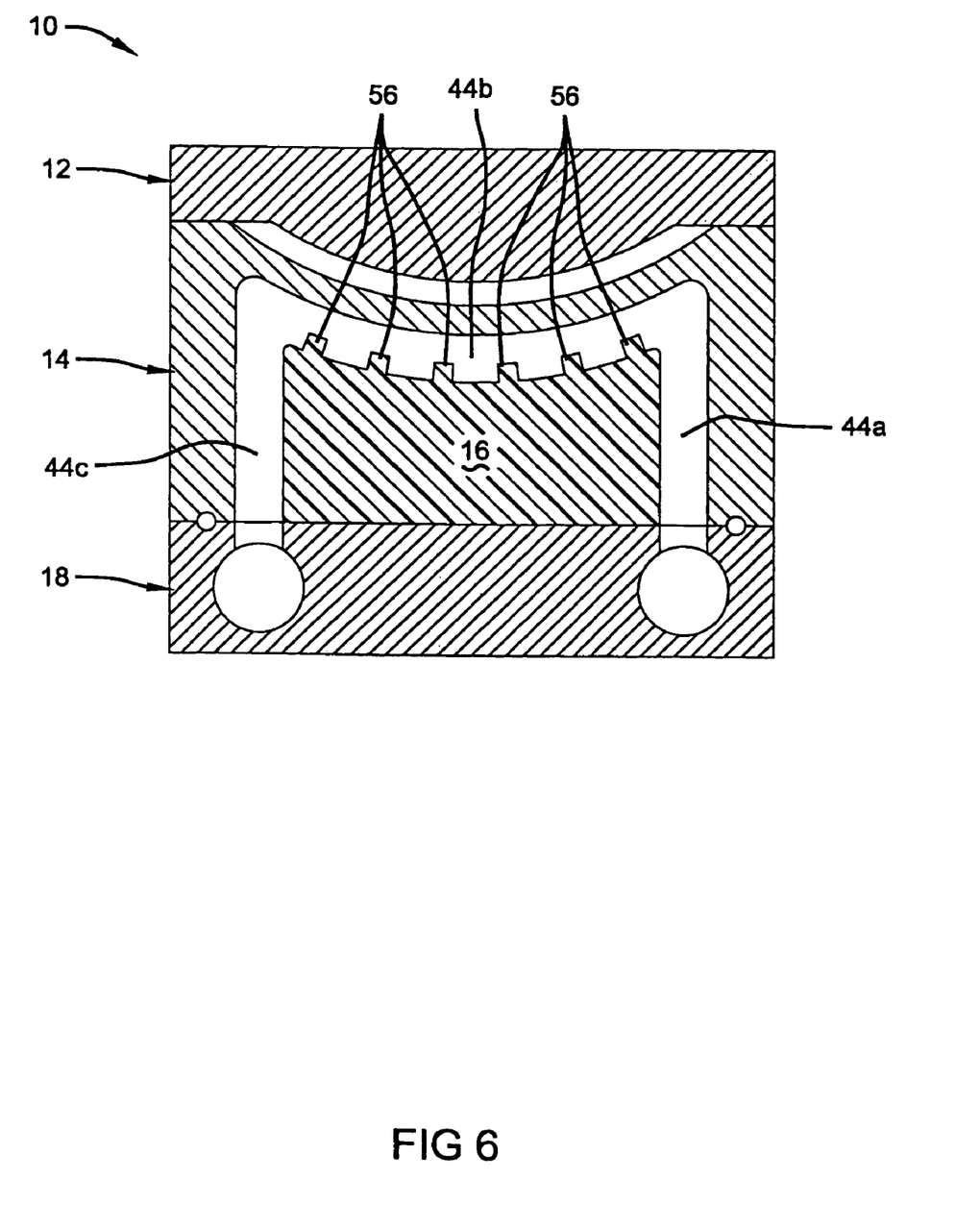
FIG. 6 is a cross-sectional view of an alternative embodiment of an apparatus for molding a material in accordance with the principles of the present invention taken through line VI-VI in FIG. 3.

FIG. 6 illustrates an alternative embodiment of the molding apparatus 10 in accordance with the present invention. The alternative embodiment is identical to the embodiment described above, with the exception that the plurality of rib inserts 16 further include a plurality of interference arms 56. The plurality of interference arms 56 agitate the coolant flow, thereby increasing the turbulence of a fluid flowing through the thermal conduction conduits 44b. This increased turbulence ensures that the entire potential of the fluid is utilized in removing or inputting thermal energy to the thermal conduction surfaces 32. It should be appreciated that in an alternative embodiment, the thermal conduction surfaces 32 may also include interference arms 56 or some other turbulence increasing structure. For example, the thermal conduction surfaces 32 may include a textured surface finish created by a sanding, grinding, or similar operation. Lastly, while the interference arms 56 are depicted as being integrally formed with the rib inserts 16, they may also be independent components. The independent components may includes screws threaded into the end surfaces 38 of the rib inserts 16. Similarly, screws may be threaded into the thermal conduction surfaces 32 to provide the desired turbulence increasing structure.

Figure 1:
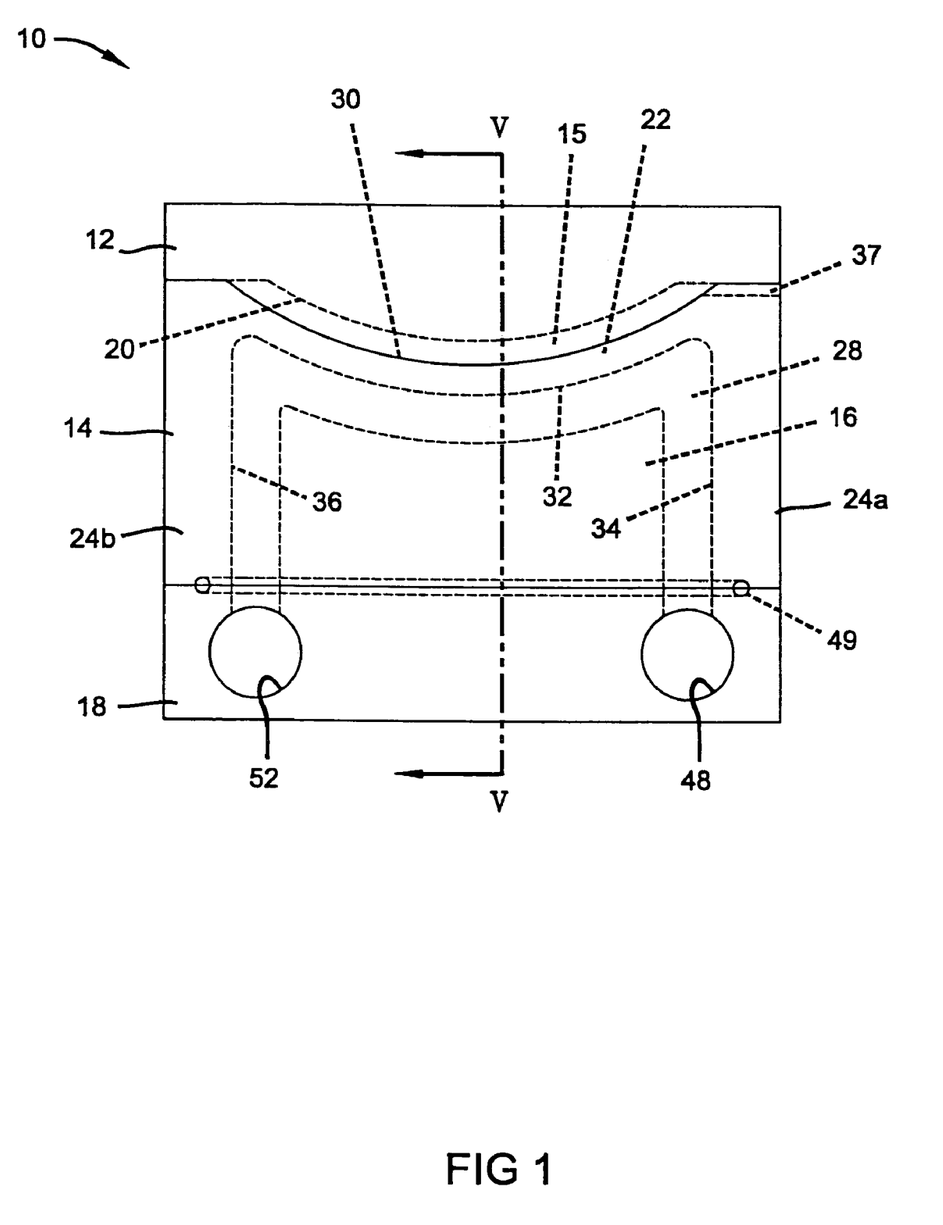
FIG. 1 is an end view of an apparatus for molding a material in accordance with the principles of the present invention.

During operation, the components of the molding apparatus 10 are assembled, as shown in FIG. 1. A coolant source is attached to the input bore 48. A drain source is attached to the output bore 52. A material source, such as an injection molding machine, is attached to the injection port 37. The coolant source pumps a coolant into the input bore 48 and through the plurality of fluid communication conduits 44. The coolant then exits the output bore 52 and drains from the apparatus 10. In an exemplary embodiment, the fluid flow is continuously supplied to the input bore 48. Next, a molding material is injected through the injection port 37 to fill the part cavity 15. Once the part cavity 15 is completely filled, injection ceases. The part is then allowed to cool. During the cooling process, coolant flows through the fluid communication conduits 44 and removes heat from the injected part 15. Once the injected part fully cools and hardens, the head mold 12 is removed from the block mold 14 and the part is extracted.

After successive molding cycles, the plurality of fluid communication conduits 44 often begin to corrode. Corrosion is caused by the use of water as a coolant. Water contains minerals that tend to attach to the inner walls of the fluid communication conduits 44, thereby decreasing the thermal conductivity of the plurality of thermal conduction surfaces 32. Therefore, the plurality of fluid communication conduits 44 must be cleaned.

First, the back plate 18 is removed from the apparatus 10. The plurality of rib inserts 16 are then removed from between the plurality of ribs 28. This exposes the pluralities of inlet surfaces 34, outlet surfaces 36, and thermal conduction surfaces 32 of the block mold 14. Furthermore, the pluralities of inlet surfaces 40, outlet surfaces 42, and end surfaces 38 of the rib inserts 16 are exposed. This allows for a variety of cleaning operations to be utilized in cleaning the mold apparatus 10. Such cleaning operations may include chemical treatment, power washing, or tooling. It is envisioned that both the plurality of rib inserts 16, as well as the thermal conduction surfaces 32, are cleaned.

An additional advantage of the present invention provides a method of manufacturing the molding apparatus 10. The first molding surface 20 of the head mold 12 is machined to define the contours of a desired part. Likewise, the molding surface 30 of the block mold 14 is machined to define the contours of the desired part. A plurality of generally parallel channels are then machined into the block mold 14 opposite the molding surface 30. These plurality of parallel channels form the plurality of ribs 28 and the plurality of thermal conduction surfaces 32. In an exemplary embodiment, this machining process is done with a standard multi-axis mill or CNC machining operation utilizing a standard bal-tipped milling tool. It should be appreciated that no specific customized equipment is required. The standard mill is capable of machining the channels to variable depths according to the predetermined contour of the molding surface 30. This provides for the molding skin 22 having a uniform thickness, as discussed above.

Furthermore, once the channels have been cut, an additional step is taken to produce the arch-shaped portions 32a and shoulder portions 32b of the thermal conduction surfaces 32. This is accomplished by making a slightly deeper cut than that made for the channels. This deeper cut is made with a ball-tipped tool. In an alternative embodiment, the channels and arch-shaped profile of the thermal conduction surfaces 32 are cut simultaneously. This cut is made with a tool customized to create the desired profile. In yet another alternative embodiment, the profile of the thermal conduction surfaces 32 do not include flattened shoulder portions 32b. In this embodiment, a single cut is made with a ball-tipped tool.

Next, the plurality of rib inserts 16 are machined. A plurality of generally planar members are first machined to the desired thickness of the rib inserts 16. This thickness is substantially similar to the thickness of the channels machined into the block mold 14. The planar members are then machined to provide the inlet surfaces 40, outlet surfaces 42, and end surfaces 38 of the plurality of rib inserts 16. The end surfaces 38 are cut according to the predetermined contour of the molding surface 30. Then, the planar members are cut to the appropriate heights and widths to finalize the rib inserts 16. A height dimension of the plurality of rib inserts 16 are smaller than a depth dimension of the channels in the block mold 14. This ensures a substantially uniform offset to define the thermal conduction conduits 44b. Additionally, a width dimension of the rib inserts 16 are slightly smaller than a width dimension of the channels. This ensures a substantially uniform offset to define the inlet conduits 44a and outlet conduits 44c. Then, the input bore 48 and output bore 52 are cut into the back plate 18. Finally, the plurality of input throats 50 and output throats 54 are cut through the support surface 46.

In the embodiment wherein the back plate 18 and plurality of rib inserts 16 are constructed of a one-piece member, a different manufacturing approach is taken for the plurality of rib inserts 16 and back plate 18. First, the predetermined contour is cut into a top surface of a solid member. A plurality of channels are then cut through the member to create the plurality of rib inserts 16. Unlike the above-described embodiment, however, the plurality of rib inserts 16 remain fixed to the solid member. Finally, the input and output bores 48, 52, as well as the input and output throats 50, 54, are cut into the solid member to provide communication to the fluid communication conduits 44.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An apparatus for molding a plastic material comprising:
   a mold body including a first surface adapted to mold a plastic part, said mold first surface has one or more curved portions and a second surface opposite said first surface;
   a back plate removably coupled with said mold body;
   a raised contour on said back plate for forming at least one fluid communication path between said second surface and said removable back plate contour for enabling fluid to contact said second surface, said at least one fluid path having a uniform thickness between the second surface and back plate contour along said at least one fluid path for minimizing the temperature variance across said first surface.

2. The apparatus according to claim 1, wherein said second surface has a raised contour mating with said back plate raised contour for enhancing said at least one fluid communication path.

3. The apparatus according to claim 1, wherein said at least one fluid communication path provides for turbulent flow along said path.

4. The apparatus according to claim 1, wherein said second surface follows said first surface for providing a substantially uniform thickness of said mold between said first and second surface.

5. The apparatus according to claim 1, wherein said raised contour is integrally formed with said back plate.

6. The apparatus according to claim 1, wherein said contour and back plate are a one piece design.

7. The apparatus according to claim 4, wherein said mold uniform thickness is between 3 mm-30 mm.

8. An apparatus for molding a plastic material comprising:
   a mold body including a first surface, at least a portion of the first surface being curved to mold a plastic part and a second surface opposite said first surface, said second surface following said first surface for providing a substantially uniform thickness between said first and second surfaces;
   a back plate removably coupled with said mold body;
   a contour on said back plate for forming at least one fluid communication path between said second surface and said removably back plate contour for enabling fluid to contact said second surface, said at least one fluid path having a uniform thickness between the second surface and back plate contour along said at least one fluid path for minimizing the temperature variance across said first surface.

9. The apparatus according to claim 8, wherein said mold uniform thickness is between 3 mm-30 mm.

10. The apparatus according to claim 8, wherein said back plate includes a plurality of fluid communication paths.

11. The apparatus according to claim 8, wherein a fluid tight seal exists between said mold body and said back plate.

12. An apparatus for injection molding a thermoplastic material comprising:
    an injection mold body including a first surface adapted to mold a thermoplastic part, said mold first surface has one or more curved portions and a second surface opposite said first surface;
    a back plate removably coupled with said injection mold body;
    a raised contour on said back plate for forming at least one fluid communication path between said second surface and said removable back plate contour for enabling fluid to contact said second surface, said at least one fluid path having a uniform thickness between the second surface and back plate contour along said at least one fluid path for minimizing the temperature variance across said first surface.

13. The apparatus according to claim 12, wherein said second surface has a raised contour mating with said back plate raised contour for enhancing said at least one fluid communication path.

14. The apparatus according to claim 12, wherein said at least one fluid communication path provides for turbulent flow along said path.

15. The apparatus according to claim 12, wherein said second surface follows said first surface for providing a substantially uniform thickness of said mold between said first and second surface.

16. The apparatus according to claim 15, wherein said mold uniform thickness is between 3 mm-30 mm.

* * * * *